US012537059B2

(12) United States Patent
Shao et al.

(10) Patent No.: US 12,537,059 B2
(45) Date of Patent: Jan. 27, 2026

(54) METHOD OF OPERATING A MEMORY CONTROLLER, MEMORY CONTROLLER, AND MEMORY SYSTEM

(71) Applicant: YANGTZE MEMORY TECHNOLOGIES CO., LTD., Wuhan (CN)

(72) Inventors: Xiao Shao, Wuhan (CN); Qian Sun, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 243 days.

(21) Appl. No.: 18/531,563

(22) Filed: Dec. 6, 2023

(65) Prior Publication Data

US 2025/0069667 A1 Feb. 27, 2025

(30) Foreign Application Priority Data

Aug. 22, 2023 (CN) .......................... 202311071532.X

(51) Int. Cl.
| | |
|---|---|
| *G11C 7/00* | (2006.01) |
| *G11C 16/08* | (2006.01) |
| *G11C 16/10* | (2006.01) |
| *G11C 16/26* | (2006.01) |

(52) U.S. Cl.
CPC ............ *G11C 16/102* (2013.01); *G11C 16/08* (2013.01); *G11C 16/26* (2013.01)

(58) Field of Classification Search
CPC ....... G11C 7/1078; G11C 7/22; G11C 7/1006; G11C 7/1072; G11C 7/1096
USPC ...................................................... 365/189.16
See application file for complete search history.

(56) References Cited

U.S. PATENT DOCUMENTS

| | | | | |
|---|---|---|---|---|
| 2014/0226412 | A1* | 8/2014 | Yeh ..................... | G11C 16/3418 365/185.21 |
| 2017/0123655 | A1* | 5/2017 | Sinclair .................. | G06F 3/061 |

* cited by examiner

*Primary Examiner* — Son T Dinh
(74) *Attorney, Agent, or Firm* — BAYES PLLC

(57) ABSTRACT

The present disclosure provides a method operating a memory controller. In response to a data write instruction, the method may include determining a first memory cell block into which data is to be written, the first memory cell block including a first memory cell page programmed and a second memory cell page unprogrammed. In response to the first memory cell block meeting the first condition related to a number of reads of the first memory cell page, the method may include determining that a number of first word lines coupled to the first memory cell page is greater than a first threshold. In response to the number of the first word lines not being greater than the first threshold, the method may include writing data into the second memory cell page coupled to a second word line in the first memory cell block.

20 Claims, 14 Drawing Sheets

METHOD OF OPERATING A MEMORY CONTROLLER, MEMORY CONTROLLER, AND MEMORY SYSTEM

CROSS-REFERENCE TO RELATED APPLICATIONS

This application claims the benefit of priority to Chinese Application No. 202311071532.X, filed on Aug. 22, 2023, which is incorporated herein by reference in its entirety.

TECHNICAL FIELD

The present disclosure belongs to the field of semiconductor chip technologies, and relates to an operation method of a memory controller, a memory controller and a memory system.

BACKGROUND

Non-volatile memory (such as Not-And (NAND) flash memory) has the advantages of low cost, high capacity, and fast rewriting speed. During the use of NAND flash memory, dummy data will inevitably be programmed (written) into the NAND flash memory, thus reducing the usable space in the NAND flash memory.

SUMMARY

According to one aspect of the present disclosure, a method of operating a memory controller is provided. The method may include, in response to a data write instruction, determining a first memory cell block into which data is to be written. The first memory cell block may include a first memory cell page programmed and a second memory cell page unprogrammed. The method may include determining that the first memory cell block meets a first condition. The first condition may be related to a number of reads of the first memory cell page, the first condition being related to a number of reads of the first memory cell page. The method may include, in response to the first memory cell block meeting a first condition, determining that a number of first word lines coupled to the first memory cell page is greater than a first threshold. The method may include, in response to the number of the first word lines not being greater than the first threshold, writing data from the second memory cell page coupled to a second word line in the first memory cell block. The second word line may not be adjacent to the first word lines.

In some implementations, the method may include, in response to the first memory cell block not meeting the first condition, writing data into the second memory cell page.

In some implementations, the method may include, in response to the number of the first word lines being greater than the first threshold, determining a second memory cell block into which data is to be written.

In some implementations, the method may include writing dummy data into a memory cell page located between the first memory cell page coupled to the first word lines and the second memory cell page coupled to the second word line.

In some implementations, the method may include writing dummy data into the second memory cell page in the first memory cell block.

In some implementations, the determining that the first memory cell block meets the first condition may include acquiring a number of reads of each first word line, the number of reads of each first word line being a sum of the numbers of reads of a plurality of first memory cell pages coupled to the first word line. In some implementations, the determining that the first memory cell block meets the first condition may include determining that a number of reads of at least one first word line is greater than a second threshold.

In some implementations, the determining that the first memory cell block meets the first condition may include acquiring the number of reads of the first memory cell block. In some implementations, the determining that the first memory cell block meets the first condition may include obtaining an average of numbers of reads of the first word lines in the first memory cell block based on the number of reads of the first memory cell block. In some implementations, the determining that the first memory cell block meets the first condition may include determining that the average of the numbers of reads is greater than a second threshold.

In some implementations, the method may include determining that the number of reads of the first memory cell block is greater than a third threshold. In some implementations, the method may include, in response to the number of reads of the first memory cell block not being greater than the third threshold, writing data into the second memory cell page. In some implementations, the method may include, in response to the number of reads of the first memory cell block being greater than the third threshold, determining that the first memory cell block meets the first condition.

According to another aspect of the present disclosure, a memory controller is provided. The memory controller may include a backend interface. The memory controller may include a processor coupled to the backend interface. The processor may be configured to, in response to a data write instruction, determine a first memory cell block into which data is to be written. The first memory cell block may include a first memory cell page programmed and a second memory cell page unprogrammed. The processor may be configured to determine that the first memory cell block meets a first condition. The first condition may be related to a number of reads of the first memory cell page. The processor may be configured to, in response to the first memory cell block meeting the first condition, determine that a number of first word lines coupled to the first memory cell page is greater than a first threshold. The processor may be configured to, in response to the number of the first word lines being not greater than the first threshold, control the backend interface to send a first write command to the memory. The first write command may instruct to start writing data from the second memory cell page coupled to a second word line in the first memory cell block. The second word line may not be adjacent to the first word lines.

In some implementations, the processor may be further configured to, in response to the first memory cell block not meeting the first condition, control the backend interface to send a second write command to the memory. In some implementations, the second write command may instruct to write data to the second memory cell page.

In some implementations, the processor may be further configured to, in response to the number of the first word lines being greater than the first threshold, determine a second memory cell block into which data is to be written.

In some implementations, the processor may be further configured to control the backend interface to send the first write command to the memory. In some implementations, the first write command may further instruct to write dummy data into the memory cell page located between the first memory cell page coupled to the first word lines and the second memory cell page coupled to the second word line.

In some implementations, to determine the second memory cell block into which data is to be written, the processor may be configured to control the backend interface to send a third write command to the memory, the third write command instructing to write dummy data into the second memory cell page in the first memory cell block.

In some implementations, the memory controller may include a cache unit. In some implementations, the cache unit may be configured to cache a number of reads of each first word line. In some implementations, the number of reads of each first word line may be a sum of the numbers of reads of a plurality of first memory cell pages coupled to the first word line. In some implementations, to determine that the first memory cell block meets the first condition, the processor may be configured to acquire the number of reads of each first word line from the cache unit. In some implementations, to determine that the first memory cell block meets the first condition, the processor may be configured to determine that a number of reads of at least one first word line is greater than a second threshold.

In some implementations, the memory controller may further include a cache unit. In some implementations, the a cache unit may be configured to cache the number of reads of the first memory cell block. In some implementations, to determine that the first memory cell block meets the first condition, the processor may be configured to acquire the number of reads of the first memory cell block from the cache unit. In some implementations, to determine that the first memory cell block meets the first condition, the processor may be configured to obtain an average of numbers of reads of the first word lines in the first memory cell block based on the number of reads of the first memory cell block. In some implementations, to determine that the first memory cell block meets the first condition, the processor may be configured to determine that the average of the numbers of reads is greater than a second threshold.

In some implementations, the processor may be further configured to, in response to the data write instruction, determine that the number of reads of the first memory cell block is greater than a third threshold. In some implementations, the processor may be further configured to, in response to the number of reads of the first memory cell block not being greater than the third threshold, start writing data from memory cells coupled to the first word lines and into which data has not been written. In some implementations, the processor may be further configured to, in response to the number of reads of the first memory cell block being greater than the third threshold, determine that the first memory cell block meets the first condition.

According to a further aspect of the present disclosure, a memory system is provided. The memory system may include a memory. The memory system may include a memory controller coupled to the memory. The memory controller may be configured to, in response to a data write instruction, determine a first memory cell block into which data is to be written. The first memory cell block may include a first memory cell page programmed and a second memory cell page unprogrammed. The memory controller may be configured to determine that the first memory cell block meets a first condition. The first condition may be related to a number of reads of the first memory cell page. The memory controller may be configured to, in response to the first memory cell block meeting the first condition, determine that a number of first word lines coupled to the first memory cell page is greater than a first threshold. The memory controller may be configured to, in response to the number of the first word lines being not greater than the first threshold, send a first write command to the memory. The first write command may instruct to start writing data from the second memory cell page coupled to a second word line in the first memory cell block. The second word line may not be adjacent to the first word lines. The memory may be configured to, in response to the first write command, start writing data from the second memory cell page coupled to the second word line in the first memory cell block.

In some implementations, the memory may be further configured to, in response to the first write command, write dummy data into a memory cell page located between the first memory cell page coupled to the first word lines and the second memory cell page coupled to the second word line.

In some implementations, the memory controller may be configured to, in response to the first memory cell block not meeting the first condition, send a second write command to the memory. In some implementations, the second write command may instruct to write data into the second memory cell page. In some implementations, the memory may be further configured to, in response to the second write command, write data into the second memory cell page.

In some implementations, the memory controller may be further configured to, in response to the number of the first word lines being greater than the first threshold, determine a second memory cell block into which data is to be written, and send a third write command to the memory. In some implementations, the third write command may instruct to write the dummy data into the second memory cell page in the first memory cell block. In some implementations, the memory may be further configured to, in response to the third write command, write the dummy data into the second memory cell pages in the first memory cell block.

BRIEF DESCRIPTION OF THE DRAWINGS

In order to illustrate the technical solutions in the present disclosure more clearly, the accompanying drawings required in some implementations of the present disclosure will be briefly introduced in the following. Obviously, the accompanying drawings in the following description are only figures of some implementations of the present disclosure. For those of ordinary skill in the art, other drawings can also be obtained based on these drawings. In addition, the drawings in the following description can be regarded as schematic diagrams, and are not limitations on the actual size of the product involved in the implementations of the present disclosure, the actual process of the method, the actual timing of signals, and the like.

DETAILED DESCRIPTION

Figure 1:
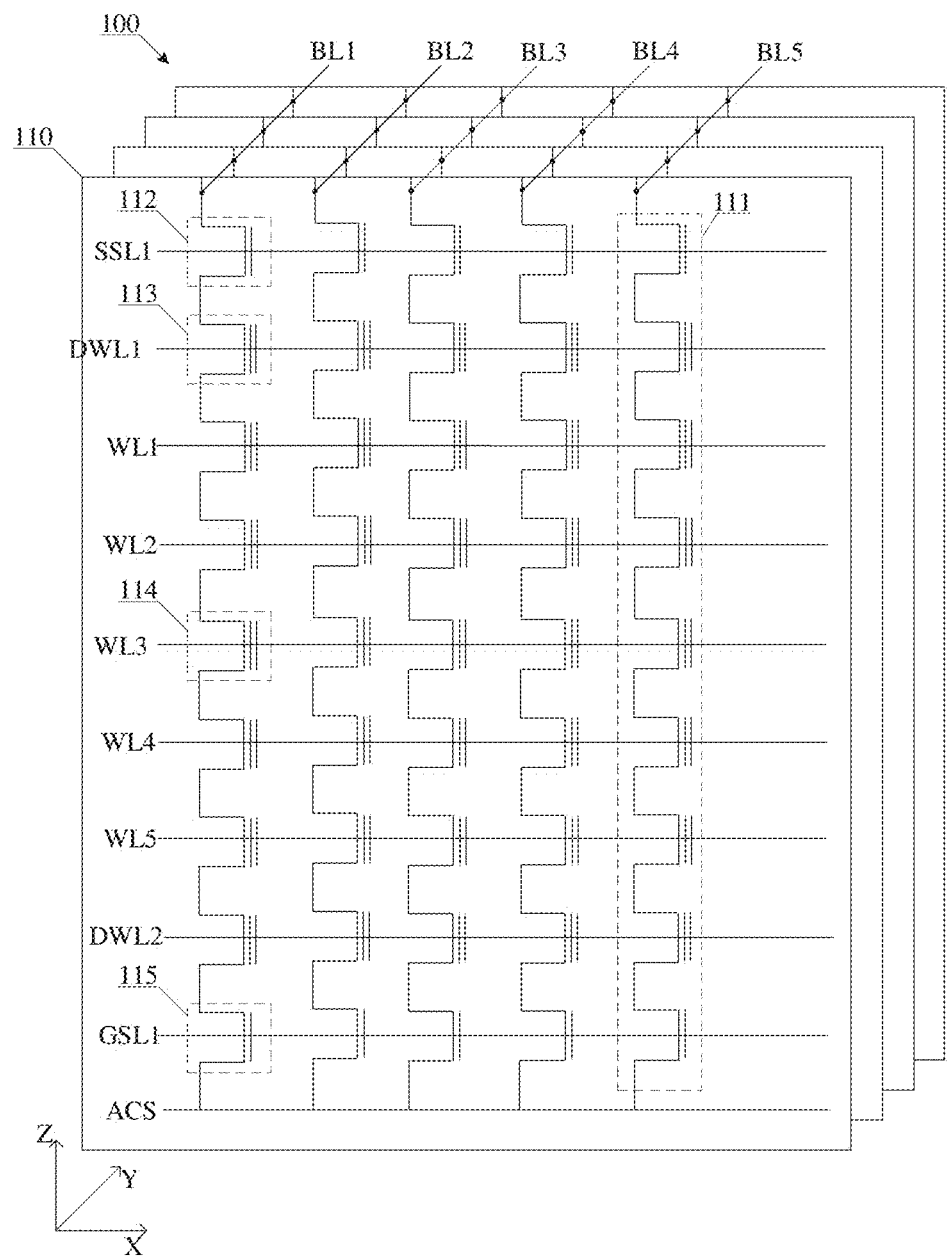
FIG. 1 is a schematic structural diagram of a possible memory cell block according to an implementation of the present disclosure.

The technical solutions in some implementations of the present disclosure will be clearly and completely described below in conjunction with the FIGS. 1-20. Apparently, the described implementations are merely some of the implementations of the present disclosure, not all implementations. All other implementations obtained by persons of ordinary skill in the art based on the implementations provided in the present disclosure fall within the protection scope of the present disclosure.

Throughout the specification and claims, the term "comprising" is interpreted in an open and inclusive sense, i.e., "including, but not limited to" unless otherwise specified explicitly or implicitly. In the description of the specification, the terms "one implementation", "some implementations", "example implementation", "exemplarily" or "some examples" etc. are intended to indicate particular features, structures, materials or characteristics associated with the implementation or example are included in at least one implementation or example of the present disclosure. Schematic representations of the above terms are not necessarily referring to the same implementation or example. Furthermore, the particular features, structures, materials or characteristics described may be included in any suitable manner in any one or more implementations or examples.

Hereinafter, the terms "first" and "second" are used for descriptive purposes only, and shall not be understood as indicating or implying relative importance or implicitly specifying the quantity of indicated technical features. Thus, a feature defined by "first" and "second" may explicitly or implicitly include one or more of these features. In the description of the implementations of the present disclosure, "plurality" means two or more, unless otherwise specified.

When describing some implementations, the expression "coupled" and its derivatives may be used. For example, when describing some implementations, the term "coupled" may be used to indicate that two or more components are in direct physical or electrical contact. In this case, "coupled" can also be described as "connected". In addition, the term "coupled" may also mean that two or more components are not in direct contact with each other, but still cooperate or interact with each other. The implementations disclosed herein are not necessarily limited by the disclosure The use of "configured to" herein means open and inclusive language that does not exclude devices that are adapted to or configured to perform additional tasks or operations.

Flash memory (flash) is a non-volatile memory that can be electrically erased and reprogrammed, which may include memories with two architectures: Not-Or (NOR) and NAND. The present disclosure takes NAND flash memory as an example for further explanation. A three-dimensional (3D) NAND flash memory cell array may include multiple memory cell blocks. Among memory cell blocks, a memory cell block in which all memory cell pages have been programmed is called a close block, and a memory cell block in which only some memory cell pages corresponding to word lines have been programmed (the remaining memory cell pages are unprogrammed) is called an open block.

As shown in FIG. 1, the memory cell block 100 may include multiple memory cell strings 111, and N memory cell strings 111 are arranged along an X-axis into memory cell slices 110 (which may also be called "memory cell groups"). M memory cell slices 110 are arranged along a Y-axis into memory cell blocks 100. As an example, N=5 and M=4. Each memory cell string 111 may include a top select gate 112 (TSG), a dummy (DMY) memory cell 113, a plurality of memory cells 114, and a bottom select gate (BSG) 115 stacked in series along a Z-axis. The X-axis, Y-axis and Z-axis are horizontal axis, longitudinal axis, and vertical axis of the space rectangular coordinate system, respectively.

In an implementation of the present disclosure, the memory cell in the NAND flash memory may be a field effect transistor capable of storing data, such as a floating gate transistor or a charge trap field effect transistor.

Figure 2:
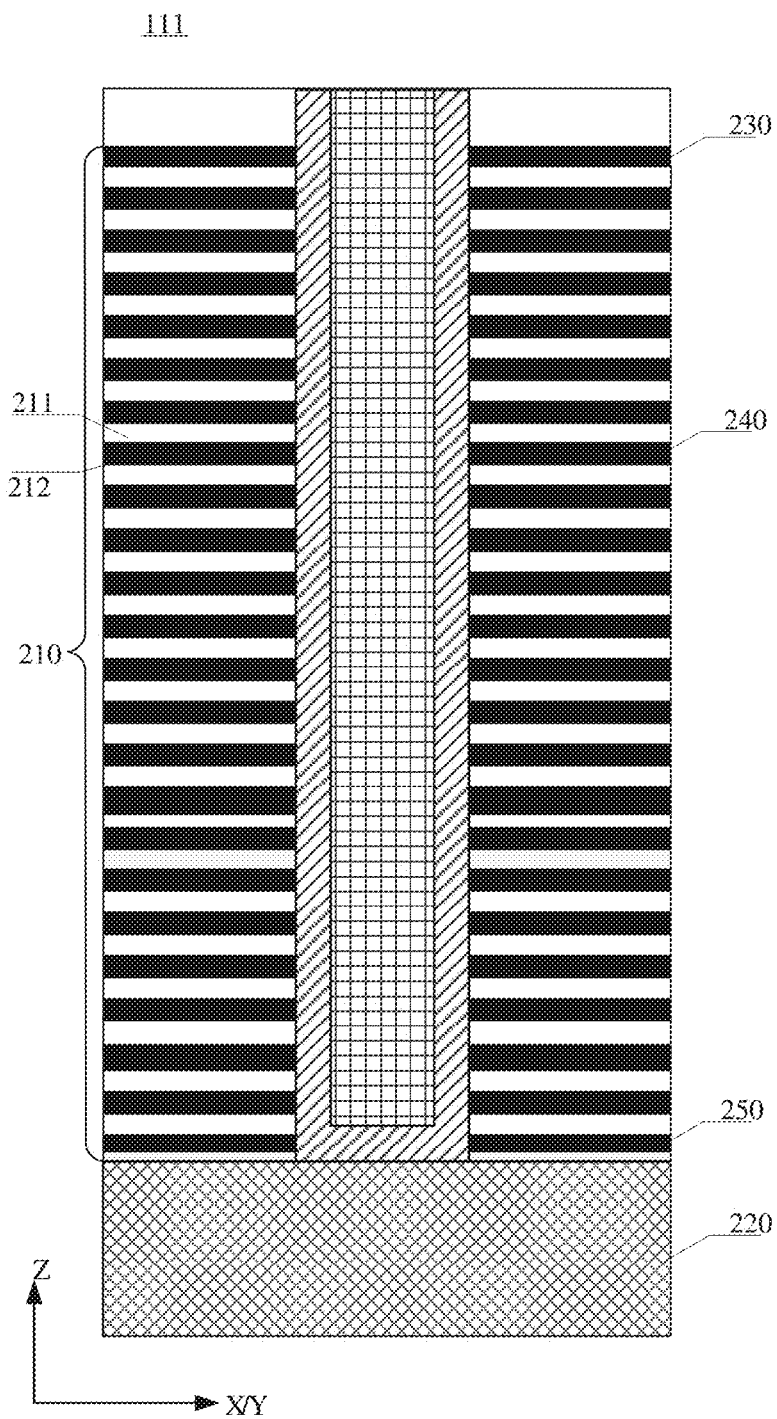
FIG. 2 is a partial cross-sectional view of a possible memory cell string, according to an implementation of the present disclosure.

FIG. 2 shows a partial cross-sectional schematic diagram of a possible memory cell string 111, according to the present disclosure. Memory cell strings 111 may extend vertically through memory stack layer 210 over substrate 220. Substrate 220 may include silicon (e.g., monocrystalline silicon), silicon germanium (SiGe), gallium arsenide (GaAs), germanium (Ge), silicon on insulator (SOI), germanium on insulator (GOI), or any other suitable materials.

The memory stack layer 210 may include alternating gate conductive layers 211 and dielectric layers 212. The number of memory cells 114 in the memory cell string 111 may be determined by the number of gate conductive layers 211 and dielectric layers 212 in the memory stack layer 210.

The gate conductive layer 211 may include a conductive material including, but not limited to, tungsten (W), cobalt (Co), copper (Cu), aluminum (Al), polysilicon, doped silicon, silicide, or any combination thereof. In some implementations, each gate conductive layer 211 includes a metal layer, such as a tungsten layer. In some implementations, each gate conductive layer 211 includes a doped-polysilicon layer. Each gate conductive layer 211 may include a control gate surrounding the memory cell 114. The gate conductive layer 211 at the top of the memory stack layer 210 may extend laterally as a string select line (SSL) 230, the gate conductive layer 211 at the bottom of the memory stack layer 210 may laterally extend as a ground select line (GSL) 250, or the gate conductive layer 211 between the string select line 230 and the ground select line 250 can be extended laterally as a word line 240 (WL).

It should be understood that, although not shown in FIG. 2, additional components of memory cell array 500 may be formed, including, but not limited to, gate line gaps/source contacts, local contacts, interconnect layers, etc.

Figure 3:
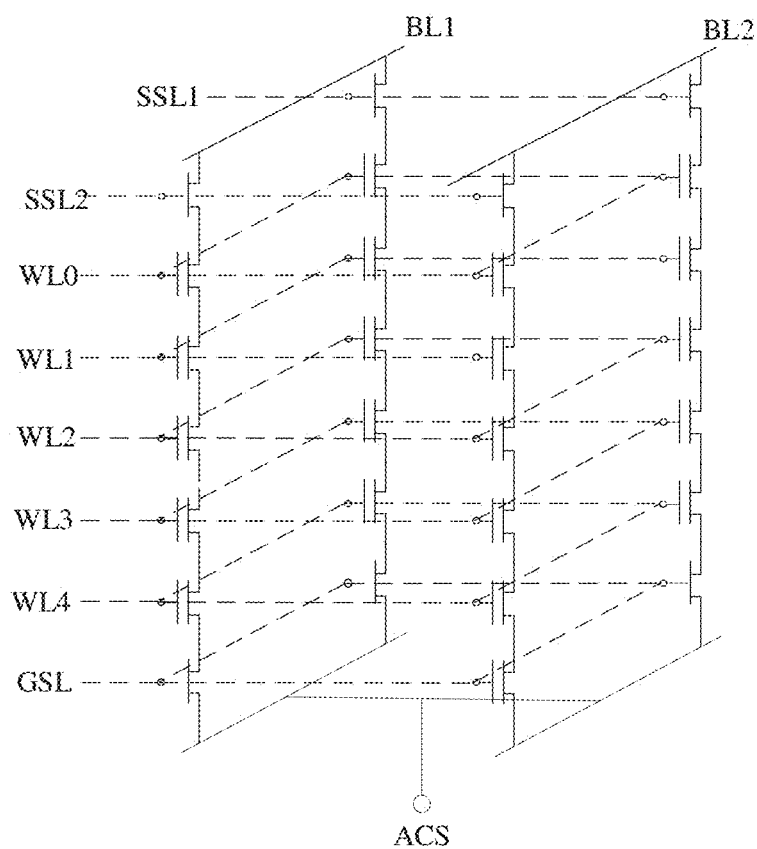
FIG. 3 is a schematic structural diagram of another possible memory cell block, according to an implementation of the present disclosure.

As shown in FIGS. 1 and 3, for M memory cell strings 111 in the same memory cell slice 110, the gate of the TSG 112 in each memory cell string 111 is coupled to the same string select line, and the gate of the BSG 115 in each memory cell string 111 is coupled to the same ground select line.

The M memory cell strings 111 in the memory cell slice 110 are coupled to M bit lines (BL) in a one-to-one correspondence. For example, the drains of the TSGs 112 in the memory cell strings 111 are coupled to the bit lines. In order to reduce the number of bit lines, the memory cell strings 111 in N memory cell slices 110 can share M bit lines. That is to say, the memory cell string 111 in any one memory cell slice 110 and memory cell strings 111 at corresponding positions in the other (N−1) memory cell slices 110 are coupled to the same bit line.

For the N*M memory cell strings 111 in the N memory cell slices 110, the control gate of the memory cell 114 in any one memory cell string 111 and the control gates of memory cells 114 at corresponding positions in other (N*M−1) memory cell strings 111 are coupled to the same word line. Furthermore, the control gate of the dummy memory cell 113 in any one memory cell string 111 and the control gates of the dummy memory cell 113 at corresponding positions in other (N*M−1) memory cell strings 111 are coupled to the same dummy word line (DWL). The memory cells 114 coupled to the same word line in a memory cell slice 110 may be called a memory cell page 216 (physical page).

The sources of the BSGs 115 in the N*M memory cell strings 111 may be coupled to a common source line (CSL). The common source line may also be called an array common source (ACS). It should be noted that the drawings of the present disclosure only illustrate the structure of the memory in some implementations. In practice, the memory can be structured in other ways. For example, a source of a BSG 115 in the N*M memory cell strings 111 can be similar to the drain. The memory cell strings 111 in N memory cell slices 110 can share M source lines. That is, the memory cell strings 111 in any one memory cell slice 110 and the memory cell strings 111 at corresponding positions in other (N−1) memory cell slices 110 are coupled to the same source line.

Performing a read operation on the memory cell page is to measure the threshold voltage Vt of all memory cells 114 in the memory cell page. Because a direct measurement of the threshold voltage Vt of a memory cell can be challenging to obtain, and the output current of a memory cell is related to the gate voltage and threshold voltage Vt, the threshold voltage Vt of the memory cell may be determined by measuring the current.

Figure 4:
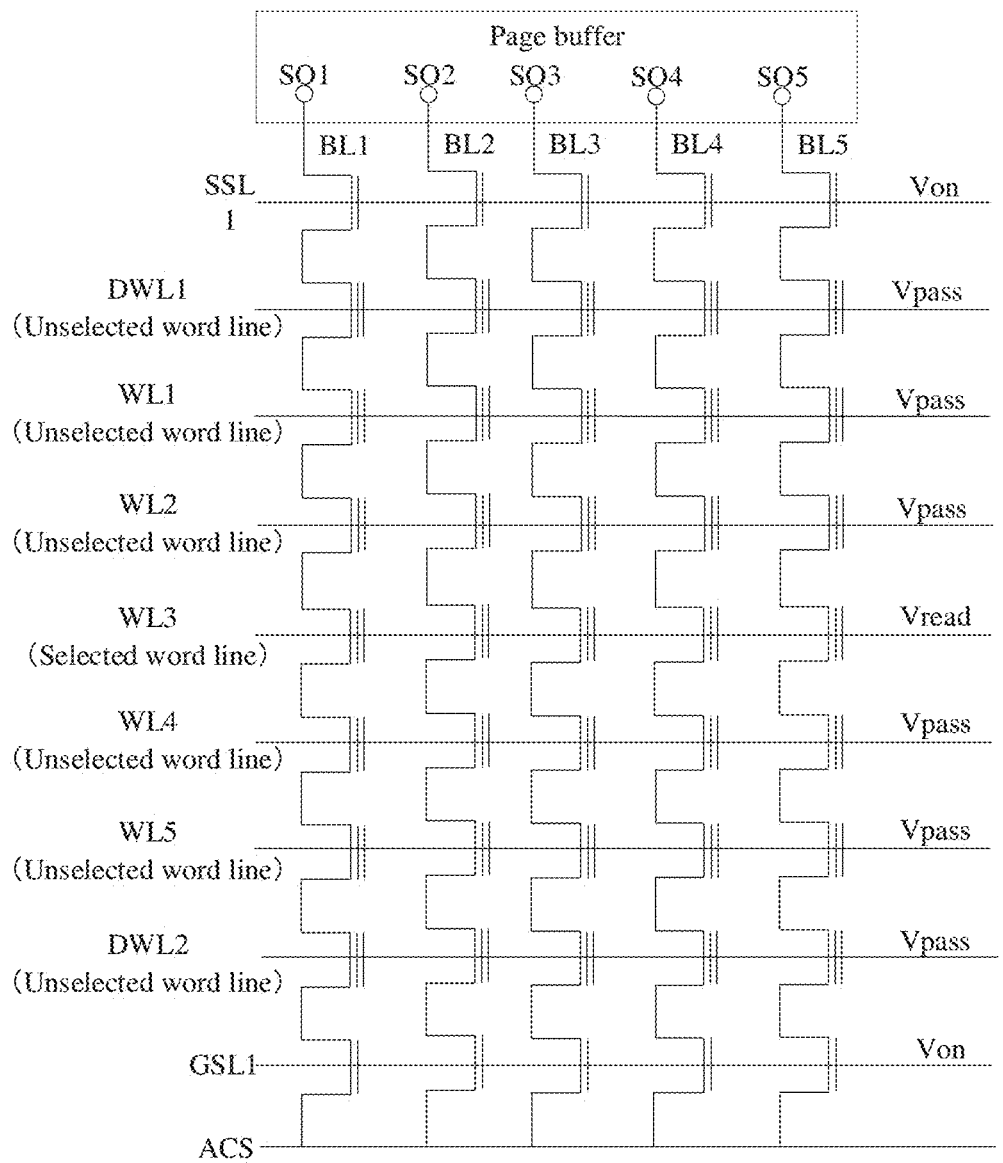
FIG. 4 is a schematic diagram of voltage application to word lines and select lines for performing read operations on memory cells.

As shown in FIG. 4, when performing a read operation, the bit line (BL) coupled to the memory cell string where the memory cell to be read is located and the sensing node (SO) in the corresponding page buffer are first charged. Afterwards, a turn-on voltage (Von) is applied to the selection line of the memory cell string where the memory cell to be read is located, a read voltage (Vread) is applied to the selected WL to which the memory cell to be read is coupled, and a pass voltage (Vpass) is applied to the unselected WLs other than the selected WL.

Figure 5:
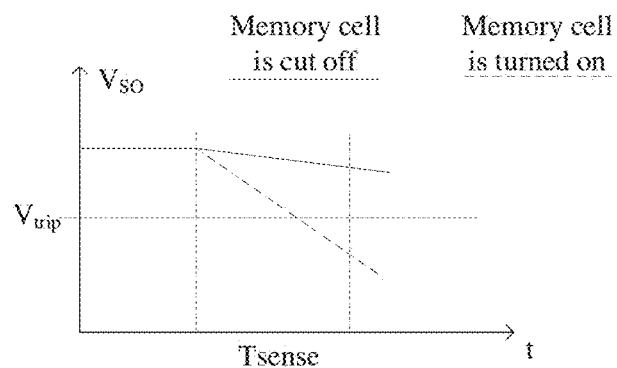
FIG. 5 is a schematic diagram of reading result judgment in performing a read operation on memory cells.

As shown in FIG. 5, after the sensing duration (Tsense), the state of the memory cell may be obtained by comparing the magnitudes of a voltage ($V_{SO}$) at the sensing node and a threshold voltage (Vtrip). In an example, if the voltage ($V_{SO}$) of the sensing node is greater than the threshold voltage (Vtrip), it means that the memory cell to be read is turned off (the discharge circuit of the sensing node is turned off, and the sensing node is not discharged). That is, the threshold voltage (Vt) may be greater than the read voltage (Vread). At this time, the data "0" is read from the memory cell to be read. Similarly, if the voltage ($V_{SO}$) at the sensing node is less than the threshold voltage (Vtrip), it means that the memory cell to be read is turned on (the discharge loop of the sensing node is turned on, and the sensing node is discharged). That is, the threshold voltage (Vt) is less than the read voltage (Vread). At this time, the data "1" is read from the memory cell to be read.

When reading operations are performed on open blocks, a strong electric field will be formed between the gate and channel of the memory cell coupled to the unselected word line by the pass voltage (Vpass). This electric field has a certain probability of causing charges to enter the floating gate (or charge trap) of the memory cell, thereby causing read disturbance (increasing the threshold voltage of the memory cell), and thus, a weak programming effect on the memory cells coupled to the non-selected word lines. The accumulated weak programming may cause the data bits of the memory cells to flip. The accuracy of subsequent programming of memory cell pages unprogrammed is affected. Therefore, when programming an open block, a read operation may be used to determine whether the currently memory cell page unprogrammed meets the programming conditions. When it is found that the programming conditions are not met, dummy data is programmed (written) into the memory cell pages unprogrammed in the entire open block. However, programming dummy data into memory cell pages unprogrammed in the entire open block reduces the storage space utilization of the open block to a certain extent.

The implementation of the present disclosure reflects the impact of read disturbance on memory cell pages unprogrammed based on the number of reads of the open block. When the number of reads of the open block meets the first condition, and when the number of the first word line to which the memory cell page programmed is coupled is less than the first threshold, data is written into the memory cell page unprogrammed coupled to the second word line. The second word line is not adjacent to the first word line. Read disturbance mainly affects the memory cells adjacent to the memory cell being read. Therefore, when the currently memory cell page unprogrammed does not meet the programming conditions, data is written into the memory cell page in the second word line that is not adjacent to the first word line, which can make better use of the storage space of open blocks and improve the storage space utilization of open blocks, thereby improving the utilization of memory storage space, while ensuring the programming accuracy.

Figure 6:
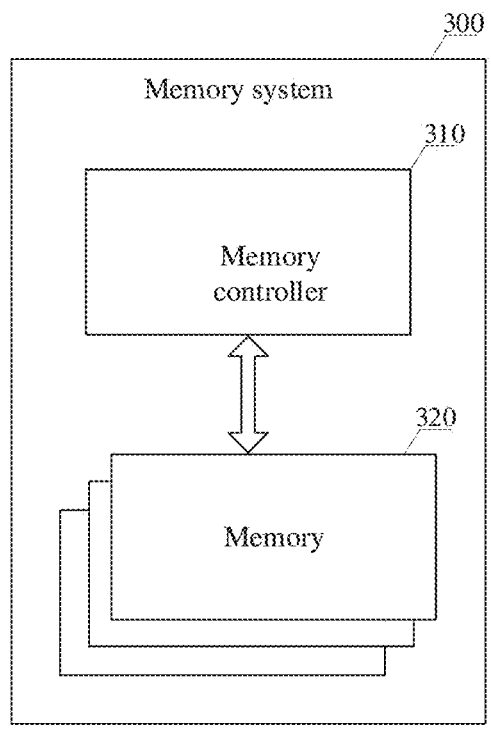
FIG. 6 is a schematic diagram of a memory system, according to an implementation of the present disclosure.

As shown in FIG. 6, the implementation of the present disclosure provides a memory system 300, which includes a memory controller 310 and a memory 320. The memory controller 310 is configured to store data to the memory 320 or read data from the memory 320. The memory system 300 can be applied and packaged into different types of electronic devices, for example, mobile phones (for example, cell phones), desktop computers, tablet computers, notebook computers, servers, vehicle-mounted equipment, game consoles, printers, positioning devices, wearable devices, smart sensors, power banks, virtual reality (VR) devices, augmented reality (AR) devices, servers and any electronic device that can store data.

Of course, the memory controller 310 may also perform any other suitable functions, e.g., such as formatting the memory 320. For example, the memory controller 310 may communicate with external devices (e.g., a host) via at least one of various interface protocols. Interface protocols can include at least one of universal serial bus (USB) protocol, multimedia card (MMC) protocol, peripheral component interconnect (PCI) protocol, PCI Express (PCI-E) protocol, advanced technology attachment (ATA) protocol, serial ATA protocol, parallel ATA protocol, small computer system interface (SCSI) protocol, enhanced small disk interface (ESDI) protocol, integrated drive electronics (IDE) protocols.

Figure 7:
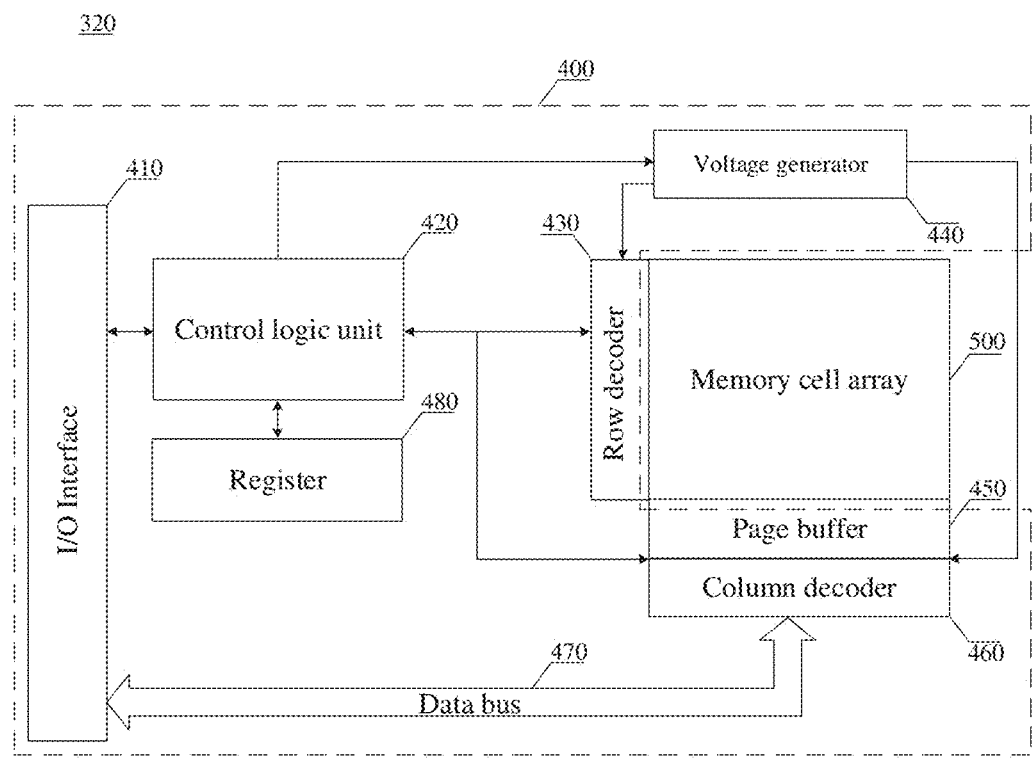
FIG. 7 is a schematic structural diagram of a memory and peripheral circuits, according to an implementation of the present disclosure.

In an example, as shown in FIG. 7, the above-mentioned memory 320 includes a memory cell array 500 and a peripheral circuit 400 coupled to the memory cell array 500. The peripheral circuit 400 is configured to control the memory cell array 500. The memory cell array 500 may include a plurality of memory cell blocks 100 as shown in FIG. 1.

As shown in FIG. 7, the peripheral circuit 400 may include an I/O interface 410, a control logic unit 420, a row decoder 430, a voltage generator 440, a page buffer 450, a column decoder 460, a data bus 470 and a register 480. It should be understood that in some examples, additional circuitry not shown in FIG. 7 may also be included. Memory cell array 500 may be coupled to peripheral circuit 400 via bit lines, common source lines, string select lines, word lines, ground select lines, etc. For example, bit lines are coupled to page buffer 450 and word lines are coupled to rows decoder 430.

The I/O interface 410 may be coupled to the control logic unit 420 and act as a control buffer to buffer and relay control commands received from a memory controller 310 (e.g., memory controller 310 in FIG. 6) to the control logic unit 420, and buffer and relay status information received from the control logic unit 420 to the memory controller 310. I/O interface 410 may also be coupled to the page buffer 450 via the data bus 470 and act as a data I/O interface 410 and data buffer to buffer and relay data to or from memory cell array 500.

The control logic unit 420 may be coupled to the voltage generator 440, the page buffer 450, the column decoder 460, the row decoder 430, the I/O interface 410 and the like, and be configured to control operations of various peripheral circuits 400. The control logic unit 420 may generate an operation signal in response to a command (CMD) or a control signal from the memory controller 310 to control operations of the row decoder 430, the column decoder 460, the page buffer 450, and the voltage generator 440. The command may be a program command, a read command, etc.

The voltage generator 440 may use an external power supply voltage or an internal power supply voltage to generate various voltages for performing operations such as erase, program, read, and verify on the memory cell array 500, such as the program voltage (Vpgm), the pass voltage (Vpass), the read voltage (Vread), the verify voltage (Vvfy) and the like applied to the word line, and the program inhibit voltage (Vinhibit), the program select voltage (Vss) and the like applied to the bit line, and combinations thereof.

The row decoder 430 may supply the word line voltage generated from the voltage generator 440 to the selected word lines and unselected word lines of the memory cell array 500 in response to the operation signal of the control logic unit 420. As described in detail below, the row decoder 430 is configured to perform program operations on memory 320 cells coupled to one or more selected word lines in the memory cell array 500.

Column decoder 460 may select one or more memory cell strings 111 in memory cell array 500 in response to operation signals from control logic unit 420.

The page buffer 450 may read data from and program (write) data to the memory cell array 500 according to an operation signal from the control logic unit 420. In one example, the page buffer 450 may store programming data (write data) to be programmed into the memory cell array 500. In another example, page buffer 450 may perform a program verify operation to ensure that data has been correctly programmed into memory cells 114 coupled to the select word line. In yet another example, the page buffer 450 may also detect low power signals from bit lines representing data bits stored in memory cells 114 and amplify small voltage into recognizable logic levels during read operations.

The register 480 may be coupled to the control logic unit 420 and include status registers, command registers, and address registers for storing status information, command operation codes (OP codes) and command addresses for controlling the operation of each peripheral circuit 400.

It should be understood by those skilled in the art that the operations performed by the row decoder 430, the page buffer 450, the control logic unit 420, and the voltage generator 440 described in the present disclosure may be performed by processing circuits. The processing circuit may include, but is not limited to, hardware of a logic circuit or a hardware/software combination of a processor that executes software.

Figure 8:
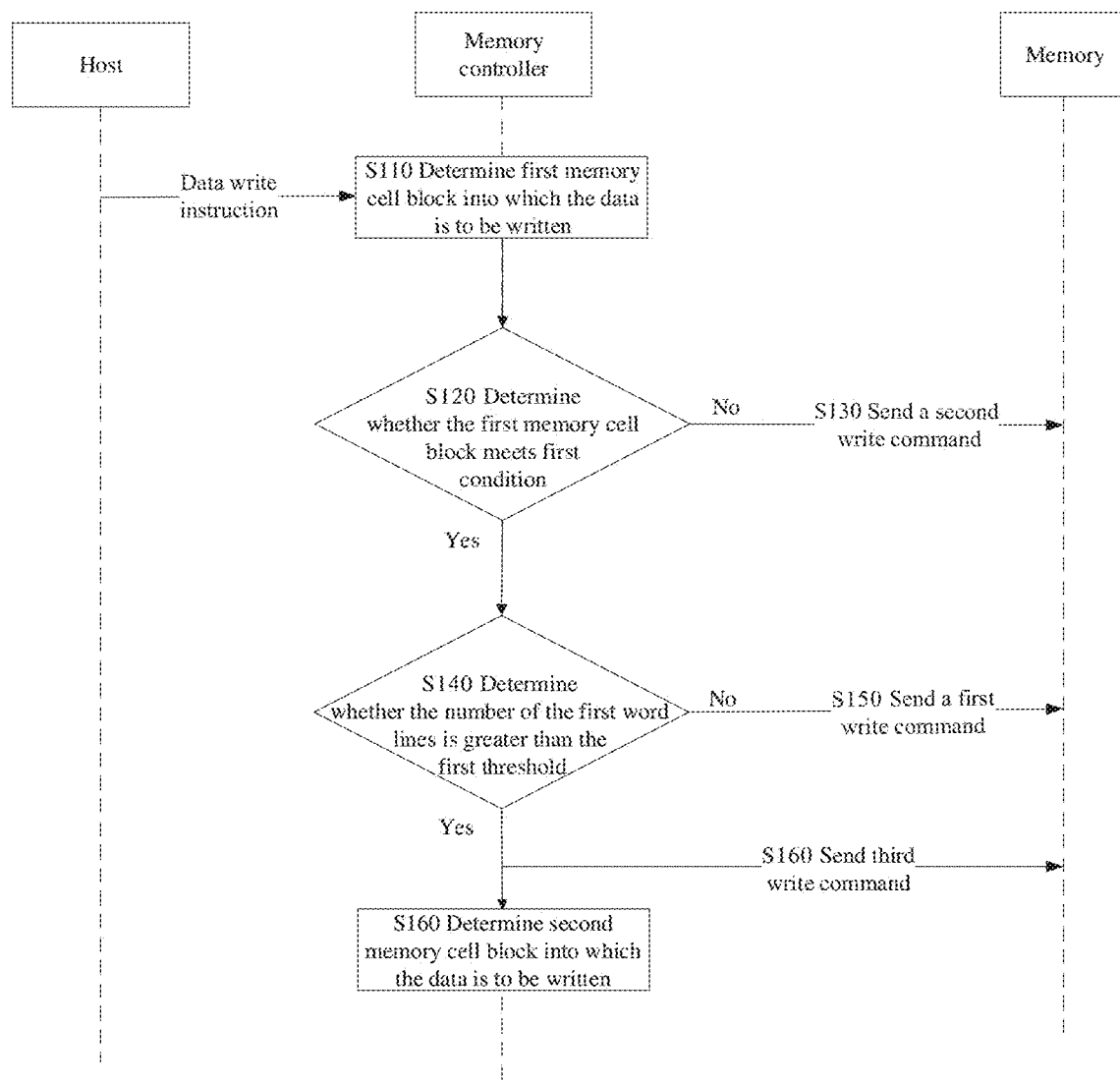
FIG. 8 is a schematic flowchart of an operation method of a memory controller in the memory system according to an implementation of the present disclosure.

In an example, FIG. 8 illustrates some operations S110-S160 that may be performed by a memory system, according to some implementations of the present disclosure.

For example, at operation, S110, in response to the data writing instruction sent by the host, the method may include determining, by the memory controller, the first memory cell block into which the data is to be written, that is, allocating a physical address for the data to be written.

In an example, when the memory controller 310 performs a programming operation on the memory 320, open blocks will inevitably appear, and the open blocks include first memory cell pages programmed and second memory cell pages unprogrammed. There is almost no charge stored in the floating gates (or charge wells) of all memory cells 114 in the second memory cell pages unprogrammed, and the threshold voltages are low. Therefore, during a read operation, when the pass voltage (Vpass) is applied to the non-selected word line, charges are more likely to enter the floating gate (or charge trap) of the memory cell 114 in the second memory cell pages unprogrammed. In addition, the charge migration that occurs in the floating gate (or charge well) is an important physical mechanism that affects the stability of the data stored in the memory 320. The greater the difference between threshold voltages of two adjacent memory cells 114 in the memory cell string 111 is, the more serious the charge migration will be. Therefore, for open blocks, the adjacent first memory cell pages programmed (high threshold voltage) and second memory cell pages unprogrammed (low threshold voltage) in the same memory cell slice 110 will face relatively serious charge migration, leading to poor data retention of the first memory cell pages programmed adjacent to the second memory cell page unprogrammed. In other words, compared to close blocks, open blocks have worse data retention and are more susceptible to read disturbance. Therefore, when determining the first memory cell block into which data is to be written, the memory controller 310 will preferably use the open block as the first memory cell block.

At operation S120, the method may include determining, by the memory controller, whether the first memory cell block meets the first condition.

Figure 9:
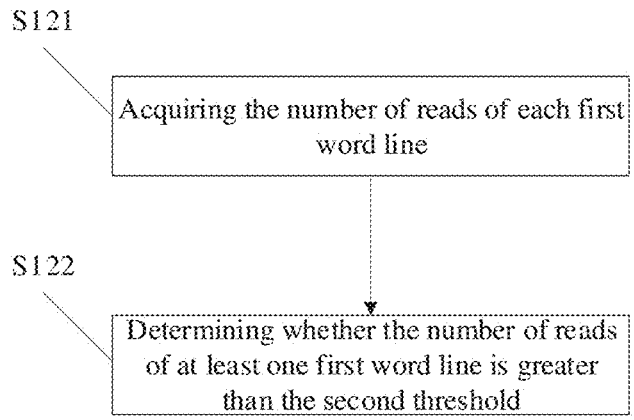
FIG. 9 is a specific flow diagram of operation S120, according to an implementation of the present disclosure.
Figure 10:
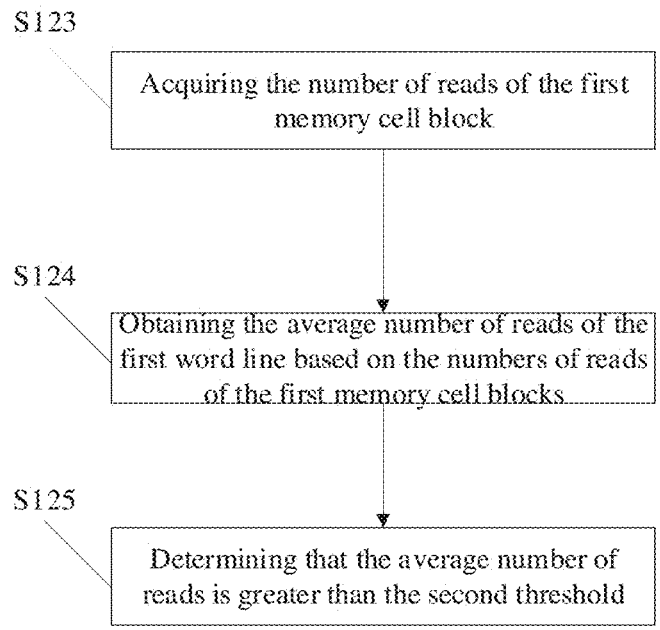
FIG. 10 is another specific flow diagram of operation S120, according to an implementation of the present disclosure.

It should be understood that the memory controller 310 may send a read command to memory 320 to read data from a first memory cell page programmed in memory 320. Moreover, each time data is read from the first memory cell page programmed, read disturbance will occur. The read disturbance will weakly program the second memory cell page unprogrammed, affecting the accuracy of subsequent programming of second memory cell page unprogrammed. Therefore, after determining the first memory cell block, the memory controller 310 may determine whether the first memory cell block meets the first condition, where the first condition is related to the number of reads of the first memory cell page programmed, and the more the number of reads, the more serious the weak programming caused by read disturbance. When the data bit flips occur in the second memory cell page unprogrammed due to multiple weak programming, programming the second memory cell page unprogrammed may not guarantee the accuracy of programming. As shown in FIGS. 9 and 10, the present disclosure provides in an example two methods to determine whether the first memory cell block meets the first condition. That is to say, executing operation S320 may include executing sub-operations S121-S122 or executing sub-operations S123-S125.

For example, at operation S121, the method may include acquiring, by the memory controller, the number of reads of each first word line.

In an example, in a logical to physical address mapping table (hereinafter referred to as "L2P table"), the physical address generally includes the serial number of the memory cell block 100 and the serial number of the memory cell page in the memory cell block 100. When recording the number of reads of each first word line, the memory controller 310 converts the number of reads of the first memory cell page programmed into the numbers of reads of a plurality of first memory cell pages programmed coupled to the first word line according to the L2P table. That is, the number of reads of each first word line is the sum of the numbers of reads of a plurality of first memory cell pages programmed coupled to the first word line.

At operation S122, the method may include determining, by the memory controller, whether the number of reads of at least one first word line is greater than the second threshold.

In an example, there may be multiple first word lines in the first memory cell block, and the memory controller 310 records the number of reads of each first word line individually. The first memory cell block can be considered to meet the first condition, as long as there is at least one first word line whose number of reads is greater than the second threshold, where the second threshold can be configured according to the product model of the memory 320 combined with historical experience.

At operation S123, the method may include acquiring, by the memory controller, the number of reads of the first memory cell block.

That is, the memory controller 310 records the number of reads of the first memory cell block as a whole.

At operation S124, the method may include obtaining, by the memory controller, the average number of reads of the first word line based on the number of reads of the first memory cell block.

At operation S125, the method may include determining, by the memory controller, that the average number of reads is greater than the second threshold.

When the average number of reads is greater than the second threshold, it can be considered that the first memory cell block meets the first condition.

It should be noted that in the above sub-operations S121-S122 and sub-operations S123-S125, whether the first memory cell block meets the first condition is determined based on the number of reads of the first word line coupled to a plurality of first memory cell pages programmed. It should be understood that for a specific model of memory 320, the number of memory cell pages coupled to each word line is definite. Therefore, the memory controller 310 may also determine whether the first memory cell block meets the first condition based on the number of reads of the first memory cell pages programmed. That is, the memory controller 310 may average the numbers of reads of the first memory cell block into an average value of one first memory cell page programmed as the number of reads of the first memory cell page programmed. Additionally and/or alternatively, the memory controller 310 may also record the number of reads of one first memory cell page programmed. The memory controller 310 determines whether the first memory cell block meets the first condition by determining the relationship between the number of reads of the first memory cell page programmed and the preset threshold.

At operation S130, if the first memory cell block does not meet the first condition, the method may include sending, by the memory controller, a second write command to the memory.

That is to say, when the first memory cell block does not meet the first condition, it indicates that the number of reads of the first word line coupled to the plurality of first memory cell pages programmed (or the number of reads of the first memory cell page programmed) is small, and the impact of read disturbance on the second memory cell page unprogrammed is not enough to cause the second memory cell page unprogrammed to fail to meet the programming conditions. The second write command instructs the peripheral circuit 400 in the memory 320 to write data into the second memory cell page unprogrammed.

When writing data into a memory cell block 100, there may be multiple programming modes, such as by-WL programming and by-string programming. The so-called by-WL programming means that the memory cell page coupled to the current word line is programmed first and then the memory cell page coupled to the next word line is programmed. The so-called by-string programming means that the memory cell page in the current memory cell slice 110 is programmed first and then the memory cell page in the next memory cell slice 110 is programmed.

As an example, a memory cell block 100 includes two memory cell slices 110 (group 0 and group 1) and three word lines (WL0, WL1, and WL2). This example includes six memory cell pages. Each memory cell page and its corresponding serial number are as shown in below in Table 1.

TABLE 1

| Memory cell page | Corresponding serial number |
|---|---|
| Memory cell page in group 0 coupled to WL0 | WL0 group 0 |
| Memory cell page in group 1 coupled to WL0 | WL0 group 1 |
| Memory cell page in group 0 coupled to WL1 | WL1 group 0 |
| Memory cell page in group 1 coupled to WL1 | WL1 group 1 |
| Memory cell page in group 0 coupled to WL2 | WL2 group 0 |
| Memory cell page in group 1 coupled to WL2 | WL2 group 1 |

The programming sequence by-WL programming may include, e.g., WL0 group 0, WL0 group 1, WL1 group 0, WL1 group 1, WL2 group 0, and WL2 group 1. In other words, when programming by WL, if WL0 group 0 is a first memory cell page that is programmed, the second write command instructs the peripheral circuit 400 in the memory 320 to write data into the second memory cell page unprogrammed starting from WL0 group 1. If WL0 group 0 and WL0 group 1 are first memory cell pages that is programmed, the second write command instructs the peripheral circuit 400 in the memory 320 to write data into the second memory cell page unprogrammed starting from WL1 group 0.

The programming sequence of by-string programming may include, e.g., WL0 group 0, WL1 group 0, WL2 group 0, WL0 group 1, WL1 group 1, and WL2 group 1. In other words, when programming by string, if WL0 group 0 is a first memory cell page programmed, the second write command instructs the peripheral circuit 400 in the memory 320 to write data into the second memory cell page unprogrammed starting from WL1 group 0. If WL0 group 0 and WL1 group 0 are first memory cell pages programmed, the second write command instructs the peripheral circuit 400 in the memory 320 to write data into the second memory cell page unprogrammed starting from WL2 group 0.

The present disclosure does not limit the programming mode of programming memory cell blocks 100.

At S140, if the first memory cell block meets the first condition, the method may include determining, by the memory controller, whether the number of first word lines is greater than the first threshold.

That is, if the number of reads of the first word lines coupled to the plurality of first memory cell pages programmed is greater than the read number threshold, the memory controller 310 determines that the number of the first word lines coupled to the first memory cell pages programmed is greater than the first threshold. The first threshold can be configured according to the product model of the memory 320 combined with historical experience.

At S150, if the number of first word lines is not greater than the first threshold, the method may include sending, by the memory controller, a first write command to the memory.

The first write command instructs the peripheral circuit 400 in the memory 320 to start writing data from the second memory cell page coupled to the second word line that is not adjacent to the first word line, and write dummy data into the memory cell page located between a first memory cell page coupled to the first word line and a second memory cell page coupled to a second word line. When reading data, read disturbance mainly affects the memory cells in the unselected word line (applied with pass voltage (Vpass)) adjacent to the selected word line (applied with read voltage (Vread)). In other words, when the second memory cell page coupled to the third word line adjacent to the first word line does not meet the programming conditions due to data bit flips caused by multiple read disturbances, the second memory cell page coupled to the second word line that is not adjacent to the first word line can often still meet the programming conditions. Therefore, the storage space utilization of the first memory cell block (open block) can be improved to a certain extent, thereby improving the utilization of memory storage space. At the same time, the threshold voltage difference between adjacent memory cell pages can be reduced, charge migration is reduced, and the data retention of the first memory cell block is improved.

At S160, if the number of first word lines is greater than the first threshold, the method may include determining, by the memory controller, the second memory cell block into which data is to be written, and sending a third write command to the memory.

The second memory cell block may be a memory cell block into which no data is written or an open block. When the second memory cell block is an open block, the operations may return to operation S110. When the second memory cell block is a memory cell block into which no data is written, the memory controller 310 may control the peripheral circuit 400 in the memory 320 to write data into the second memory cell block.

In addition, the third write command instructs the peripheral circuit 400 in the memory 320 to write dummy data to the second memory cell page in the first memory cell block. As a result, the first memory cell block becomes a close block, and the threshold voltage difference between the first memory cell page and adjacent memory cell pages is reduced, thereby reducing charge migration and improving data retention of the first memory cell block.

Figure 11:
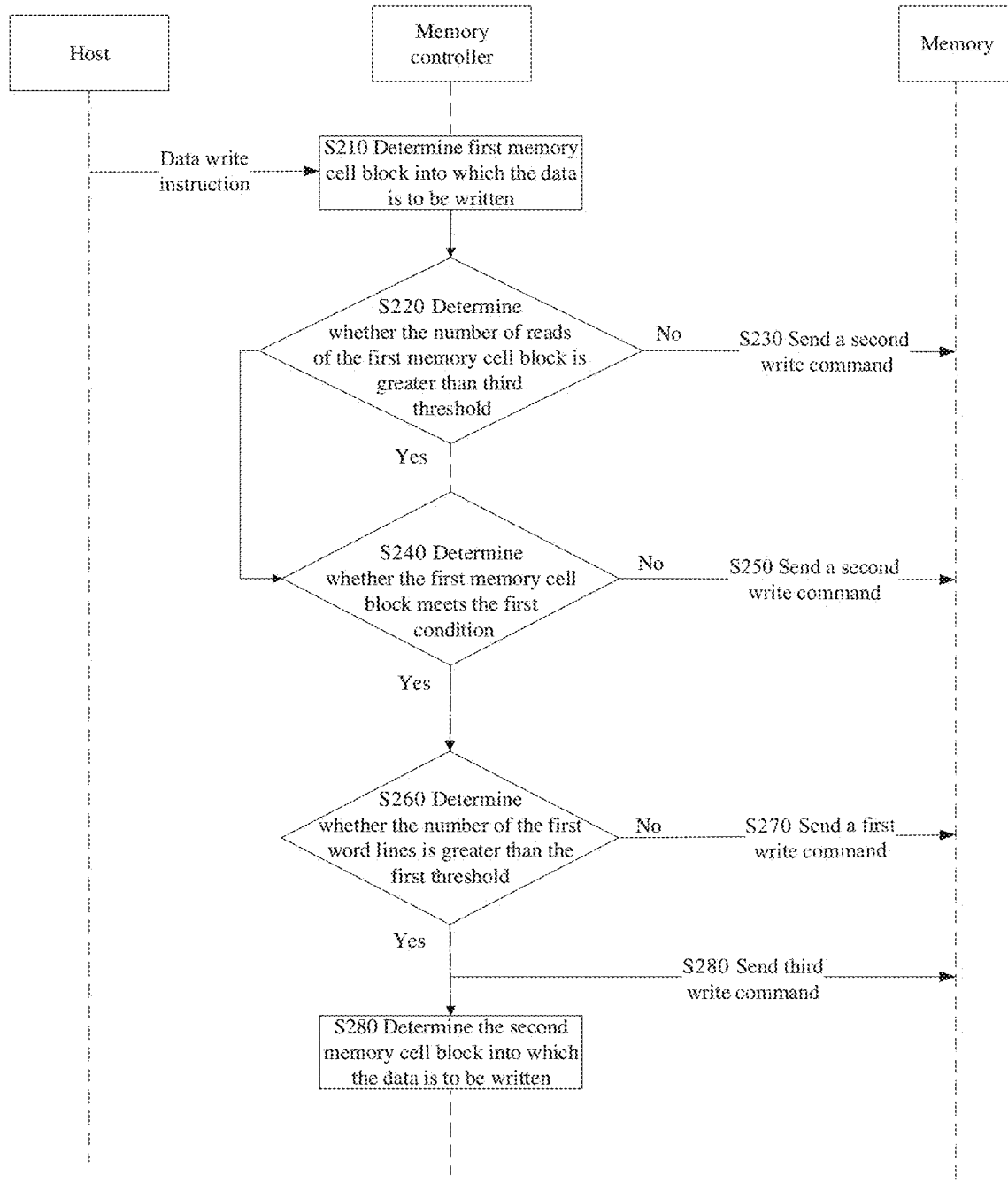
FIG. 11 is a schematic flowchart of another operation method of a memory controller in the memory system, according to an implementation of the present disclosure.

As shown in FIG. 11, an implementation of the present disclosure provides another operation method of a memory controller, and the operation method may include operations S210-S280. Among them, operation S210 may be the same or similar to operation S110 shown in FIG. 8, and operations S240-S280 may be the same or similar to operations S120-S160 shown in FIG. 8, which will not be described again in the present disclosure.

Referring to FIG. 11, at S220, the method may include determining, by the memory controller, whether the number of reads of the first memory cell block is greater than a third threshold.

The third threshold can be configured according to the product model of the memory 320 combined with historical experience.

At S230, if the number of reads of the first memory cell block is not greater than the third threshold, the method may include sending, by the memory controller, a second write command to the memory.

Similarly, when the number of reads of the first memory cell block is not greater than the third threshold, the impact of read disturbance on the second memory cell page is too insignificant to cause the second memory cell page to fail to meet the programming conditions. Therefore, the memory controller 310 may send a second write command to the memory 320 to instruct the peripheral circuit 400 in the memory 320 to write data into the second memory cell page unprogrammed.

Figure 12:
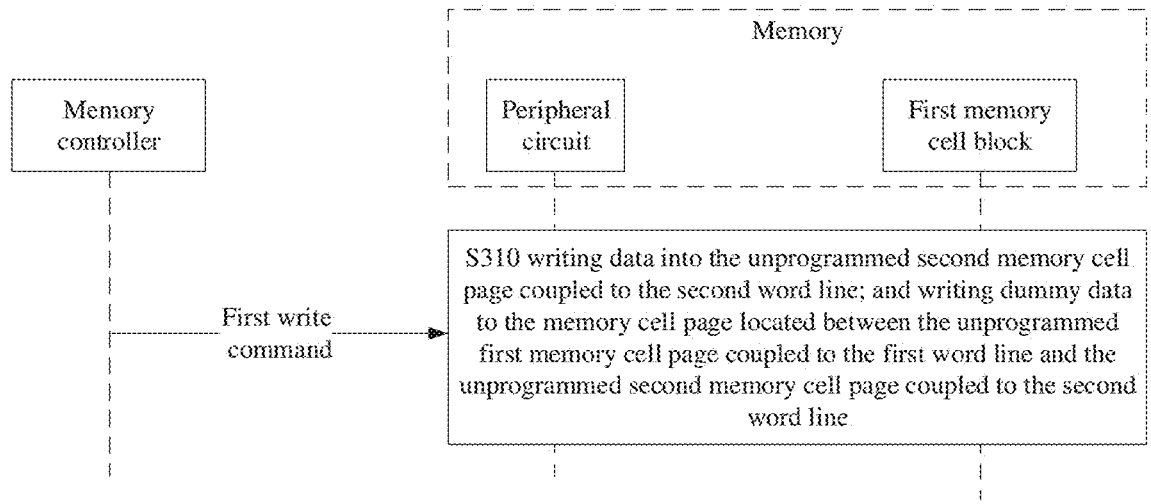
FIG. 12 is a schematic flow chart illustrating the memory responding to a first write command in the memory system, according to an implementation of the present disclosure.

As shown in FIG. 12, the memory system according to the implementation of the present disclosure may further includes operation S310.

Referring to FIG. 12, at S310, in response to the first write command sent by the memory controller, the method may include starting, by the peripheral circuit in the memory, writing data from the second memory cell page unprogrammed coupled to the second word line in the first memory cell block. Moreover, at S310, in response to the first write command sent by the memory controller, the method may include writing, by the peripheral circuit in the memory, dummy data to the memory cell page located between the first memory cell page unprogrammed coupled to the first word line and the second memory cell page unprogrammed coupled to the second word line.

In an example, the second word line is not adjacent to the first word line. That is, at least one third word line is located between the first word line and the second word line, and the number of third word lines located between the second word line and the first word line can be configured in advance. For example, one third word line may be located between the second word line and the first word line, or two third word lines may be located between the second word line and the first word line. There is at least one first memory cell page programmed among the plurality of memory cell pages coupled to the first word line. The plurality of memory cell pages coupled to the second word line are all second memory cell pages unprogrammed. The plurality of memory cell pages coupled to the third word line are all second memory cell pages unprogrammed.

Figure 13:
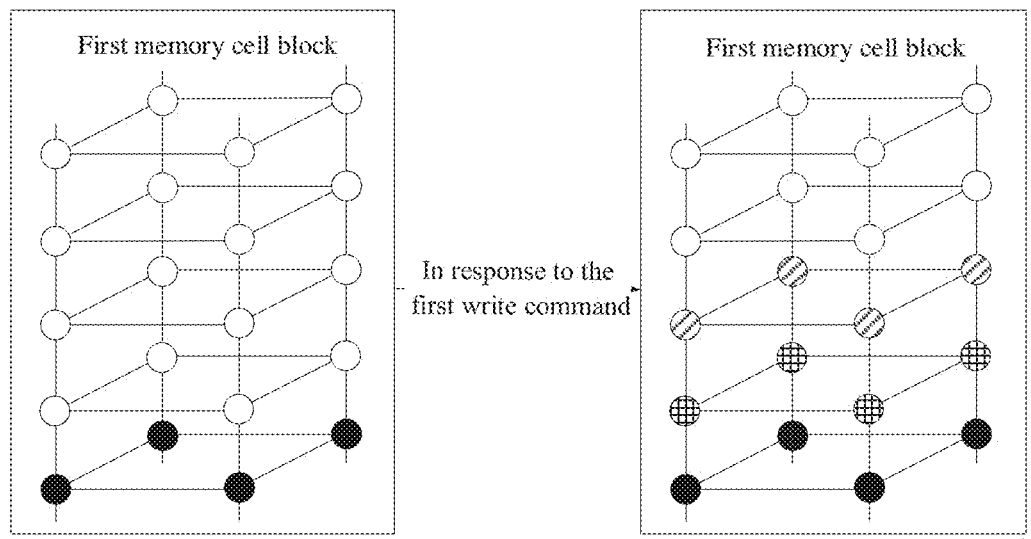
FIG. 13 is a comparison diagram illustrating a programming result of the memory responding to a first write command, according to an implementation of the present disclosure.

As shown in FIG. 13, among the plurality of memory cell pages coupled to the first word line, all of the memory cell pages may be first memory cell pages programmed. At this time, in response to the first write command, the peripheral circuit 400 in the memory 320 writes dummy data into the second memory cell page coupled to the third word line and into which no data has been written.

Figure 14:
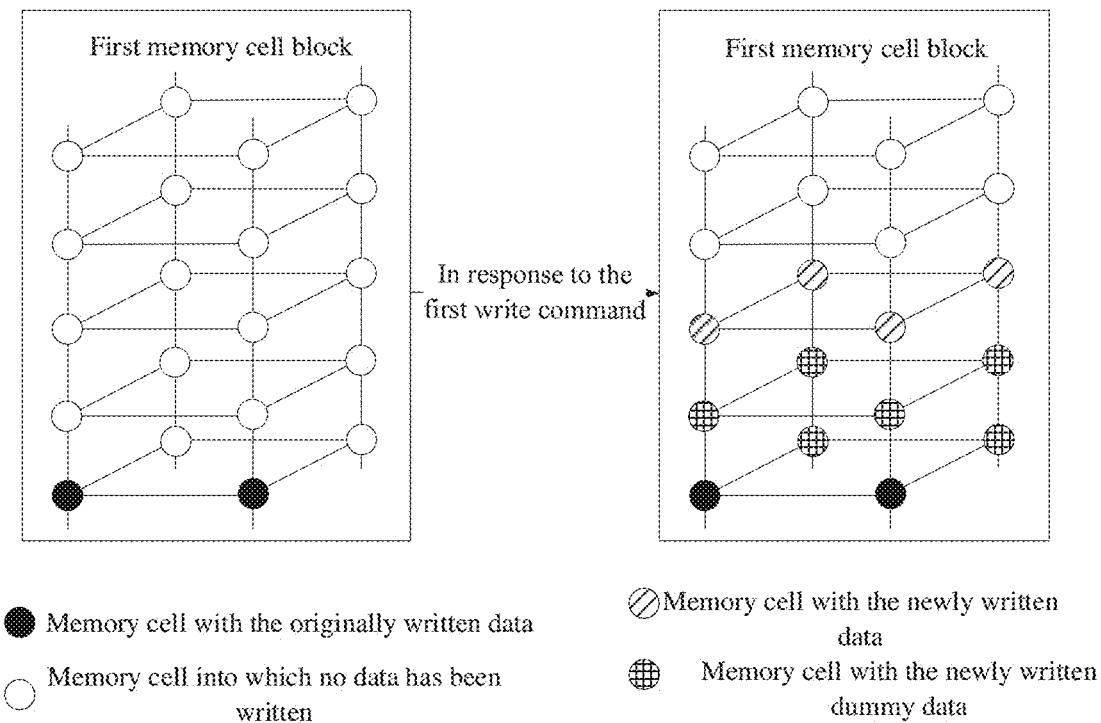
FIG. 14 is a comparison diagram illustrating another programming result of the memory responding to a first write command, according to an implementation of the present disclosure.

As shown in FIG. 14, among the plurality of memory cell pages coupled to the first word line, some of the memory cell pages may also be first memory cell pages programmed. At this time, in response to the first write command, the peripheral circuit 400 in the memory 320 writes dummy data into the second memory cell page coupled to the first word line and into which data has not been written, and into the second memory cell page coupled to the third word line and into which no data has been written.

Figure 15:
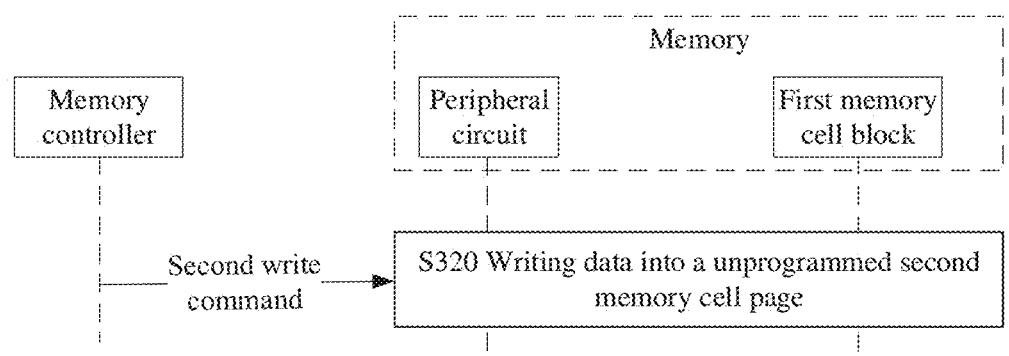
FIG. 15 is a schematic flow chart illustrating the memory responding to a second write command in the memory system, according to an implementation of the present disclosure.

As shown in FIG. 15, the memory system according to an implementation of the present disclosure may further include operation S320.

Referring to FIG. 15, at operation S320, in response to the second write command sent by the memory controller, the method may include writing, by the peripheral circuit in the memory, data into the second memory cell page unprogrammed.

Figure 16:
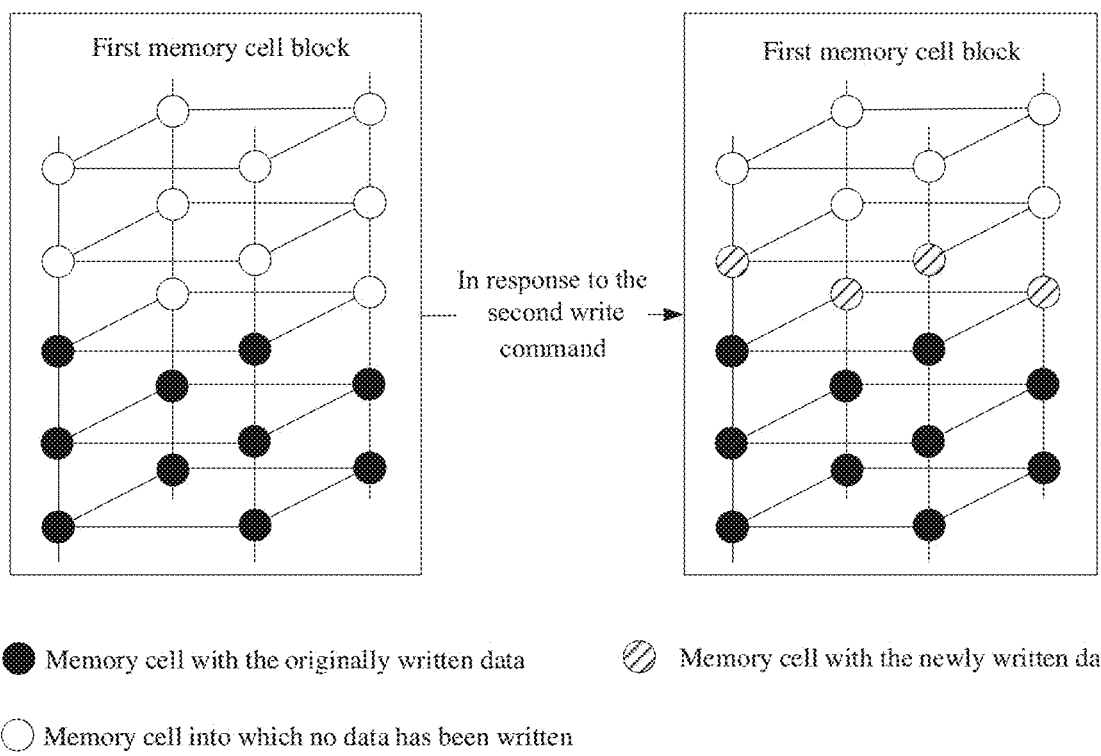
FIG. 16 is a comparison diagram illustrating a programming result of the memory responding to a second write command, according to an implementation of the present disclosure.

In an example, FIG. 16 shows that there are three first word lines in the first memory cell block, and the number of first word lines is greater than the first threshold. As shown in FIG. 16, at this time, in response to the second write command, the peripheral circuit 400 in the memory 320 writes data into the second memory cell pages unprogrammed coupled to the third (from bottom to top in FIG. 16) and fourth of the word lines.

Figure 17:
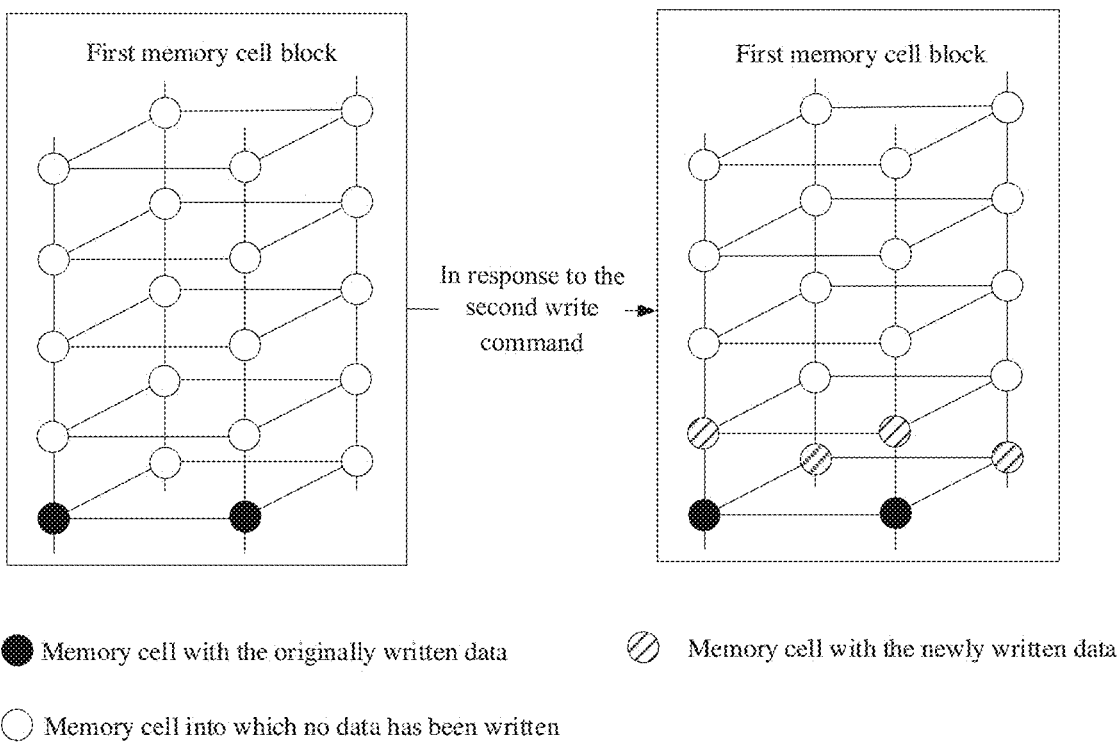
FIG. 17 is a comparison diagram of another programming result of the memory responding to a second write command, according to the implementation of the present disclosure.

In an example, FIG. 17 shows that there is one first word line in the first memory cell block, and the number of the first word lines is less than the first threshold. As shown in FIG. 17, at this time, in response to the second write command, the peripheral circuit 400 in the memory 320 writes data into the second memory cell page unprogrammed coupled to the first (from bottom to top in FIG. 17) and second of the word lines.

Figure 18:
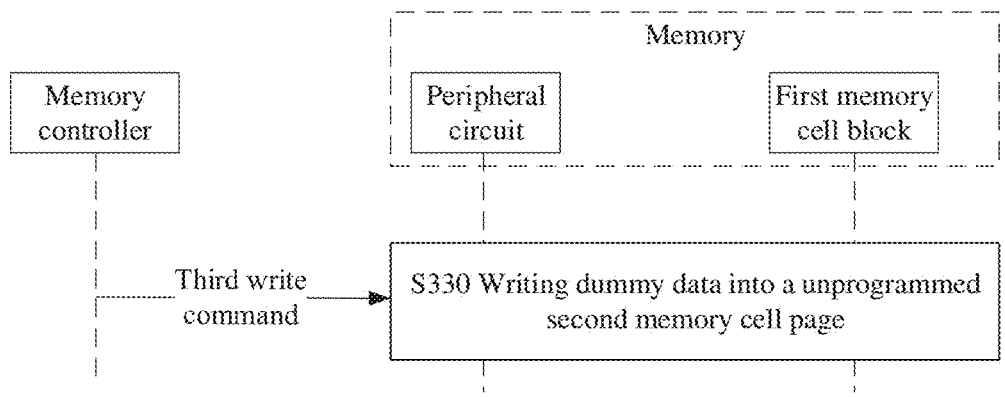
FIG. 18 is a schematic flow chart of the memory responding to a third write command in the memory system, according to an implementation of the present disclosure.

As shown in FIG. 18, the memory system according to an implementation of the present disclosure may further include operation S330.

Referring to FIG. 18, at S330, in response to the third write command sent by the memory controller, the method may include writing, by the peripheral circuit in the memory, dummy data into the second memory cell page unprogrammed in the first memory cell block.

Figure 19:
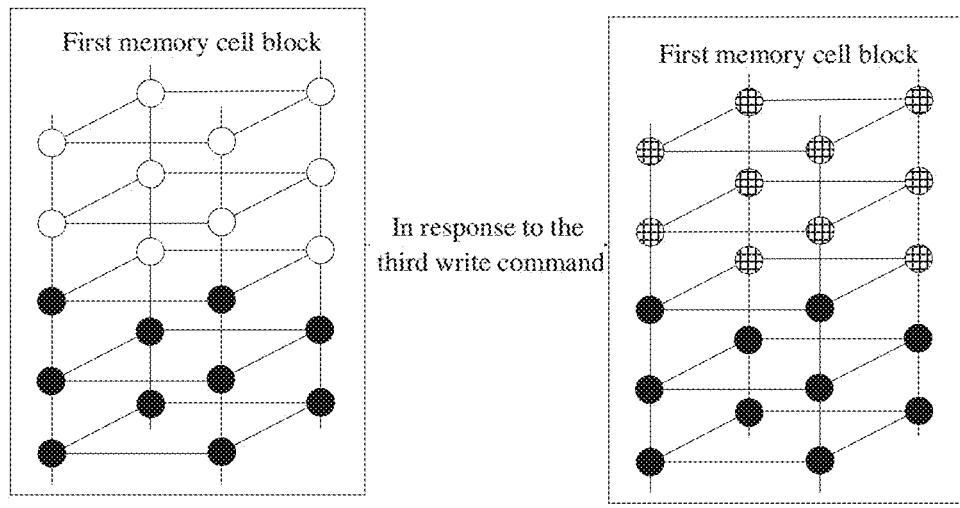
FIG. 19 is a comparison chart of a programming result of the memory responding to a third write command according to the implementation of the present disclosure.

As shown in FIG. 19, the first memory cell block becomes a close block, so that the threshold voltage difference between the first memory cell page and adjacent memory cell pages is reduced, thereby reducing charge migration and improving the data retention of the first memory cell block.

It should be understood that writing data into an second memory cell page unprogrammed coupled to the first word line (or second word line) described in the present disclosure is intended to indicate the starting memory cell page for writing data, and does not mean data is only written into the second memory cell page unprogrammed of the first word line (or second word line). When data to be written comprises multiple memory cell pages, the memory 320 can write data into the second memory cell pages unprogrammed on other word lines according to various programming modes (such as by-WL programming or by-string programming). In other words, after data is written into all second memory cell pages unprogrammed coupled to the first word line, data can be continued to be written to the second memory cell pages unprogrammed coupled to the third word line and the second word line, or even to next memory cell block (for example, a second memory cell block).

Figure 20:
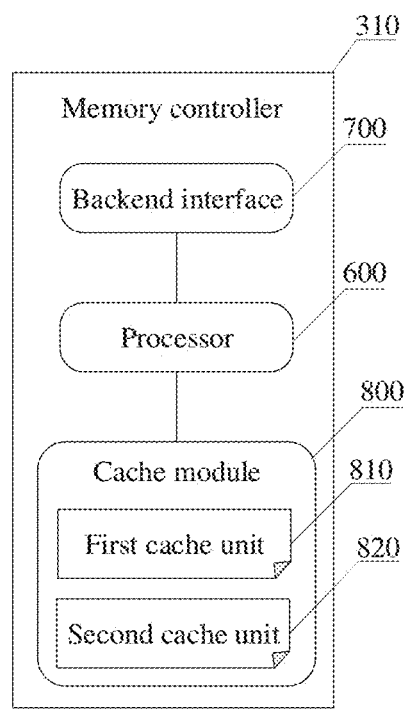
FIG. 20 is a schematic structural diagram of a memory controller, according to an implementation of the present disclosure.

As shown in FIG. 20, an implementation of the present disclosure provides a memory controller 310. The memory controller 310 includes a processor 600, a backend interface 700, and a cache module 800. The cache module 800 may include a first cache unit 810 for caching the number of reads of a single first word line and/or a second cache unit 820 for caching the number of reads of a first memory cell block.

The processor 600 can execute the above operation S210 (operation S110), operation S220, operation S240 (operation S120), operation S260 (operation S140), and operation S280 (operation S160). The processor 600 can control the backend interface 700 to execute operation S230, operation S250 (operation S130), operation S270 (operation S150), and S280 (operation S160).

It should be understood that each module of memory controller 310 described herein may be a software module run on a processor 600 that is part of memory controller 310 (e.g., a microcontroller unit (MCU)), or may be a hardware module of a finite state machine (FSM) (e.g., integrated circuit (IC), application specific IC (ASIC), field programmable gate array (FPGA), and the like)), or may be a combination of software modules and hardware modules.

Implementations of the present disclosure further provide a computer-readable storage medium that stores computer-executable instructions, which, when executed, can implement the operations in the above method implementation, for example, performing the operation(s) depicted in FIGS. 8-12, 15, and 18.

Implementations of the present disclosure provide a computer device, including a processor, and a readable storage medium coupled to the processor. The readable storage medium stores executable instructions, which, when executed by the processor, can implement the operations in the above method implementation, for example, performing the method as shown in FIGS. 8-12, 15, and 18.

Implementations of the present disclosure provide an operation method of a memory controller, a memory controller, and a memory system. When the number of reads of the first memory cell block meets the first condition, and the number of the first word lines coupled to the memory cell page programmed is less than the first threshold, data may be written into the memory cell page unprogrammed coupled to the second word line not adjacent to the first word line. On the premise of ensuring programming accuracy, an improvement to storage-space utilization of open blocks can be achieved.

Those skilled in the art can clearly understand that the descriptions of each of the above-mentioned implementations highlight different aspects for the convenience and brevity of description, and the parts that are not described in detail in a certain implementation can be implemented by referring to the corresponding process in the aforementioned method implementation and will not be repeated herein.

It should be understood that in the various implementations of the present disclosure, the size of the sequence numbers of the above-mentioned processes does not mean the order of execution. The execution order of each process should be determined by its functions and internal logic, and should not constitute any limitation to implementation process of the present disclosure.

Those skilled in the art can appreciate that the modules and algorithm operations of the examples described in conjunction with the implementations disclosed herein can be implemented by electronic hardware, or a combination of computer software and electronic hardware. Whether these functions are executed by hardware or software depends on the specific application and design constraints of the technical solution. Skilled artisans may use different methods to implement the described functions for each specific application, but such implementation should not be regarded as going beyond the scope of the present disclosure.

The above description is only a detailed description of the present disclosure, but the scope of protection of the present disclosure is not limited thereto. Any changes or substitutions that can be easily conceived by those skilled in the art within the technical scope disclosed in the present disclosure shall be encompassed within the protection scope of the present disclosure. Therefore, the protection scope of the present disclosure should be determined by the protection scope of the claims.

What is claimed is:

1. A method of operating a memory controller, comprising:
    in response to a data write instruction, determining a first memory cell block into which data is to be written, the first memory cell block comprising a first memory cell page programmed and a second memory cell page unprogrammed;
    determining that the first memory cell block meets a first condition, the first condition being related to a number of reads of the first memory cell page;
    in response to the first memory cell block meeting the first condition, determining that a number of first word lines coupled to the first memory cell page is greater than a first threshold; and
    in response to the number of the first word lines not being greater than the first threshold, writing data from the second memory cell page coupled to a second word line in the first memory cell block, the second word line not being adjacent to the first word lines.

2. The method of claim 1, further comprising:
    in response to the first memory cell block not meeting the first condition, writing data into the second memory cell page.

3. The method of claim 2, further comprising:
    in response to the number of the first word lines being greater than the first threshold, determining a second memory cell block into which data is to be written.

4. The method of claim 1, further comprising:
    writing dummy data into a memory cell page located between the first memory cell page coupled to the first word lines and the second memory cell page coupled to the second word line.

5. The method of claim 3, further comprising:
    writing dummy data into the second memory cell page in the first memory cell block.

6. The method of claim 1, wherein the determining that the first memory cell block meets the first condition comprises:
    acquiring a number of reads of each first word line, the number of reads of each first word line being a sum of the numbers of reads of a plurality of first memory cell pages coupled to the first word line; and
    determining that a number of reads of at least one first word line is greater than a second threshold.

7. The method of claim 1, wherein the determining that the first memory cell block meets the first condition comprises:
    acquiring the number of reads of the first memory cell block;
    obtaining an average of numbers of reads of the first word lines in the first memory cell block based on the number of reads of the first memory cell block; and
    determining that the average of the numbers of reads is greater than a second threshold.

8. The method of claim 7, further comprising:
    determining that the number of reads of the first memory cell block is greater than a third threshold;
    in response to the number of reads of the first memory cell block not being greater than the third threshold, writing data into the second memory cell page; and
    in response to the number of reads of the first memory cell block being greater than the third threshold, determining that the first memory cell block meets the first condition.

9. A memory controller, comprising:
    a backend interface; and
    a processor coupled to the backend interface and configured to:
    in response to a data write instruction, determine a first memory cell block of a memory into which data is to be written, the first memory cell block comprising a first memory cell page programmed and a second memory cell page unprogrammed;
    determine that the first memory cell block meets a first condition, the first condition being related to a number of reads of the first memory cell page;
    in response to the first memory cell block meeting the first condition, determine that a number of first word lines coupled to the first memory cell page is greater than a first threshold; and
    in response to the number of the first word lines being not greater than the first threshold, control the backend interface to send a first write command to the memory, the first write command instructing to start writing data from the second memory cell page coupled to a second word line in the first memory cell block, the second word line not being adjacent to the first word lines.

10. The memory controller of claim 9, wherein the processor is further configured to:
   in response to the first memory cell block not meeting the first condition, control the backend interface to send a second write command to the memory, the second write command instructing to write data to the second memory cell page.

11. The memory controller of claim 10, wherein the processor is further configured to:
   in response to the number of the first word lines being greater than the first threshold, determine a second memory cell block into which data is to be written.

12. The memory controller of claim 9, wherein the processor is configured to:
   control the backend interface to send the first write command to the memory, the first write command further instructing to write dummy data into a memory cell page located between the first memory cell page coupled to the first word lines and the second memory cell page coupled to the second word line.

13. The memory controller of claim 11, wherein, to determine the second memory cell block into which data is to be written, the processor is configured to:
   control the backend interface to send a third write command to the memory, the third write command instructing to write dummy data into the second memory cell page in the first memory cell block.

14. The memory controller of claim 9, further comprising:
   a cache unit configured to:
      cache a number of reads of each first word line, the number of reads of each first word line being a sum of the numbers of reads of a plurality of first memory cell pages coupled to the first word line,
      wherein to determine that the first memory cell block meets the first condition, the processor is configured to:
         acquire the number of reads of each first word line from the cache unit; and
         determine that a number of reads of at least one first word line is greater than a second threshold.

15. The memory controller of claim 10, further comprising:
   a cache unit configured to:
      cache the number of reads of the first memory cell block,
      wherein to determine that the first memory cell block meets the first condition, the processor is configured to:
         acquire the number of reads of the first memory cell block from the cache unit;
         obtain an average of numbers of reads of the first word lines in the first memory cell block based on the number of reads of the first memory cell block; and
         determine that the average of the numbers of reads is greater than a second threshold.

16. The memory controller of claim 15, wherein the processor is further configured to:
   in response to the data write instruction, determine that the number of reads of the first memory cell block is greater than a third threshold;
   in response to the number of reads of the first memory cell block not being greater than the third threshold, start writing data from memory cells coupled to the first word lines and into which data has not been written; and
   in response to the number of reads of the first memory cell block being greater than the third threshold, determine that the first memory cell block meets the first condition.

17. A memory system, comprising:
   a memory; and
   a memory controller coupled to the memory and configured to:
      in response to a data write instruction, determine a first memory cell block into which data is to be written, the first memory cell block comprising a first memory cell page programmed and a second memory cell page unprogrammed;
      determine that the first memory cell block meets a first condition, the first condition being related to a number of reads of the first memory cell page;
      in response to the first memory cell block meeting the first condition, determine that a number of first word lines coupled to the first memory cell page is greater than a first threshold; and
      in response to the number of the first word lines being not greater than the first threshold, send a first write command to the memory, the first write command instructing to start writing data from the second memory cell page coupled to a second word line in the first memory cell block, the second word line not being adjacent to the first word lines,
   wherein the memory is configured to:
      in response to the first write command, start writing data from the second memory cell page coupled to the second word line in the first memory cell block.

18. The memory system of claim 17, wherein the memory is further configured to:
   in response to the first write command, write dummy data into a memory cell page located between the first memory cell page coupled to the first word lines and the second memory cell page coupled to the second word line.

19. The memory system of claim 18, wherein:
   the memory controller is configured to:
      in response to the first memory cell block not meeting the first condition, send a second write command to the memory, the second write command instructing to write data into the second memory cell page; and
   the memory is further configured to:
      in response to the second write command, write data into the second memory cell page.

20. The memory system of claim 19, wherein:
   the memory controller is further configured to:
      in response to the number of the first word lines being greater than the first threshold, determine a second memory cell block into which data is to be written, and send a third write command to the memory, the third write command instructing to write the dummy data into the second memory cell page in the first memory cell block; and
   the memory is further configured to:
      in response to the third write command, write the dummy data into the second memory cell pages in the first memory cell block.

* * * * *